C. M. HAHN & A. B. GREEN.
CAPSTAN.
APPLICATION FILED DEC. 14, 1915.
1,198,215.
Patented Sept. 12, 1916.
Fig. 1.
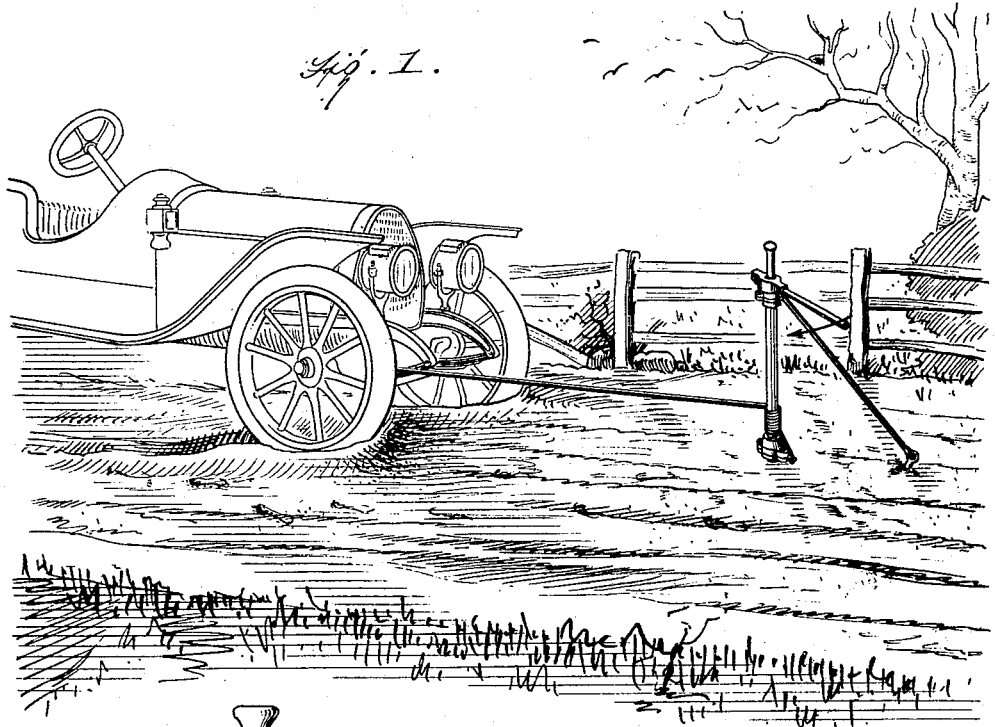
Fig. 2.
Fig. 3.
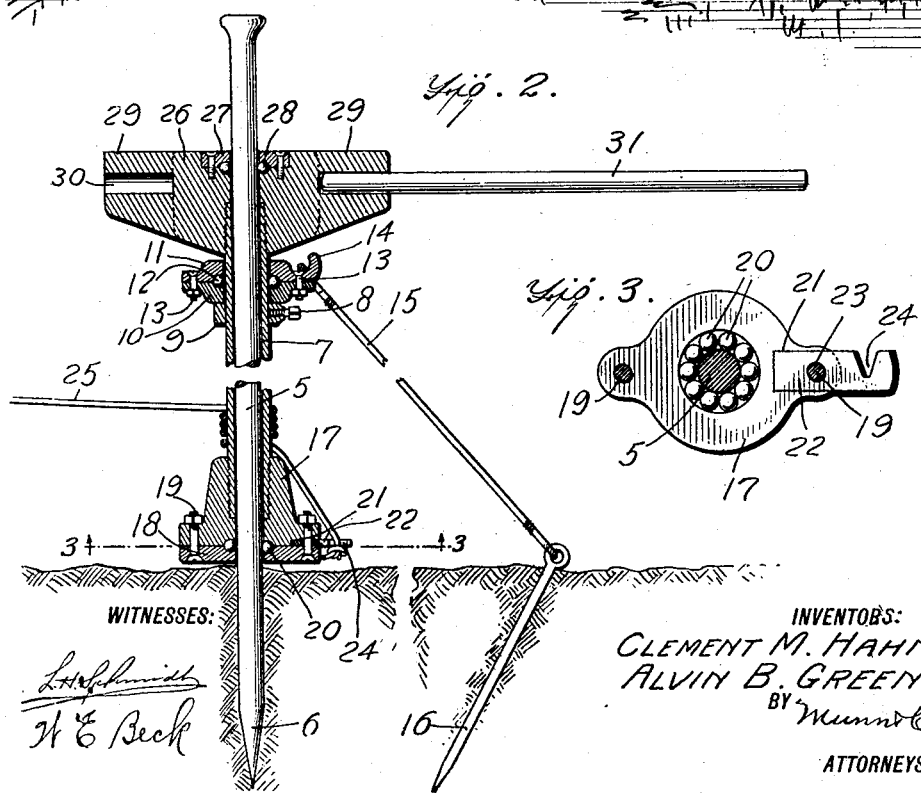
WITNESSES:
INVENTORS:
CLEMENT M. HAHN,
ALVIN B. GREEN,
BY Munn & Co.
ATTORNEYS

UNITED STATES PATENT OFFICE.

CLEMENT M. HAHN AND ALVIN B. GREEN, OF VALENTINE, NEBRASKA.

CAPSTAN.

1,198,215.　　　　　Specification of Letters Patent.　　Patented Sept. 12, 1916.

Application filed December 14, 1915. Serial No. 66,873.

*To all whom it may concern:*

Be it known that we, CLEMENT M. HAHN and ALVIN B. GREEN, citizens of the United States, and residents of Valentine, in the county of Cherry and State of Nebraska, have invented an Improvement in Capstans, of which the following is a specification.

This invention is an improvement in capstans, and has particular reference to apparatus for hauling vehicles out of ruts and soft spots in roads.

An object of the invention is the provision of a portable device of this character which may be readily set up in operative position in front of a vehicle and attached thereto by a flexible connection whereby, upon the operation of said device, said connection will be wound upon a drum or sleeve thus drawing the vehicle forward.

Another object of the invention is to provide an apparatus which is simple in construction, easy and inexpensive to manufacture, and effective in carrying out the purpose for which it is designed.

The inventive idea involved is capable of receiving a variety of mechanical expressions, one of which, for the purpose of illustrating the invention, is shown in the accompanying drawing, in which—

Figure 1 is a perspective view of the apparatus constructed in accordance with the invention and showing the same connected to an automobile. Fig. 2 is an enlarged vertical longitudinal sectional view. Fig. 3 is a transverse section on the line 3—3 of Fig. 2.

Referring more particularly to the accompanying drawing in which like reference characters indicate similar parts, the numeral 5 indicates a standard or post having a pointed end 6 which facilitates the driving of the same into the ground when it is desired to employ the apparatus. A drum or sleeve 7 is rotatable about the standard 5 and has secured thereto, by means of a set screw 8, a collar 9 whereby the same may be adjustably positioned upon the sleeve. This collar 9 supports bearing plates 10 and 11 which surround the drum 7 and interposed between said plates is a bearing race 12. The plates 10 and 11 are secured together by means of bolts 13 and plate 11 is provided with a hook 14 to which is connected one end of a guy 15, the other end of which is secured to an anchoring stake 16, which is also adapted to be driven into the ground whereby to maintain the standard 5 in its vertical position.

The ends of the drum or sleeve 7 are screw threaded and the lower end has connected thereto a lower drumhead 17 having a bearing plate 18 secured to the bottom thereof by means of bolts 19, a ball bearing race 20 being interposed between said head and plate. The bottom of the drumhead is provided in its periphery with a radially extending groove 21 adapted to receive the inner end of an arm 22 which has an opening 23 for receiving one of the bolts 19. Adjacent the outer end of the arm 22 and upon one edge thereof the same is provided with a V-shaped notch 24 whereby one end of a flexible element 25 may be securely fastened to said arm. This flexible element is adapted to be wound about the drum 7 as the latter is rotated and the other end of said element is secured to a suitable portion of a vehicle as shown in Fig. 1.

The upper threaded end of the drum 7 has mounted thereon the upper drumhead 26 having counter-sunk in its top a bearing plate 27 which retains a ball bearing race 28 in engagement with the standard 5. The drumhead 26 is provided with extensions 29 having radial sockets 30 therein for the reception of one end of an operating capstan bar or lever 31 which is employed for the purpose of rotating the drum 7 and the heads 17 and 26. It will thus be seen that as the lever or bar 31 is operated in the direction of the arrow in Fig. 1 the element 25 will be wound upon the drum 7 and the vehicle to which said element is connected will be drawn forwardly toward the device, thus extracting said vehicle from the rut or soft ground.

What is claimed is:

1. A capstan of the character described comprising a standard, a drum rotatable thereabout, bearing plates adjustably supported upon said drum, one of said plates being provided with a hook portion, an anchoring device connected to said hook portion, upper and lower drumheads secured to said drum, a notched arm secured to the lower drum head, a flexible element secured to said arm in the notch thereof and adapted to be wound about said drum, and a capstan lever engaging one of said drum heads for rotating the same whereby said flexible element may be wound thereon.

2. A capstan of the character described comprising a standard, a drum rotatable thereabout, upper and lower drumheads secured to said drum, an arm having its inner end counter-sunk in the bottom of said lower drumhead and its outer end provided with a notch, a flexible element having one end secured to said arm in said notch, and a lever engaging the upper drumhead for rotating said drum to wind said flexible element thereon.

CLEMENT M. HAHN.
ALVIN B. GREEN.

Witnesses:
D. J. FENTON,
W. V. KIRBY.

Copies of this patent may be obtained for five cents each, by addressing the "Commissioner of Patents, Washington, D. C."